(12) United States Patent
Long

(10) Patent No.: US 9,839,840 B2
(45) Date of Patent: *Dec. 12, 2017

(54) INTERCONNECTABLE HANDHELD CONTROLLERS

(71) Applicant: Oculus VR, LLC, Menlo Park, CA (US)

(72) Inventor: Clare Regimbal Long, Edmonds, WA (US)

(73) Assignee: Oculus VR, LLC, Menlo Park, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 14/934,090

(22) Filed: Nov. 5, 2015

(65) Prior Publication Data
US 2017/0128828 A1 May 11, 2017

(51) Int. Cl.
A63F 13/235 (2014.01)
(52) U.S. Cl.
CPC .................. *A63F 13/235* (2014.09)
(58) Field of Classification Search
CPC .................. A63F 13/06; G06F 3/011
See application file for complete search history.

(56) References Cited

U.S. PATENT DOCUMENTS

| | | | |
|---|---|---|---|
| 4,518,164 A * | 5/1985 | Hayford, Jr. ............ | A63F 13/06 108/43 |
| 4,552,360 A * | 11/1985 | Bromley ................. | A63F 13/06 345/159 |
| 5,181,009 A | 1/1993 | Perona | |
| D341,094 S | 11/1993 | Austin | |
| 5,265,009 A | 11/1993 | Colavita et al. | |
| D350,351 S | 9/1994 | Nakamura | |
| 5,421,590 A * | 6/1995 | Robbins ................. | A63F 13/06 273/148 B |
| 5,479,163 A * | 12/1995 | Samulewicz ......... | G06F 3/0219 341/20 |
| D369,754 S | 5/1996 | Donaldson | |
| 5,551,701 A * | 9/1996 | Bouton ................... | A63F 13/06 273/148 B |

(Continued)

OTHER PUBLICATIONS

"Hands-On with Sixense STEM VR Motion-Tracking System" written by Tested, accessed and printed from URL <https://www.youtube.com/watch?v=C8z-On6FBTM>, 5 pages.*

(Continued)

*Primary Examiner* — Jason Skaarup
(74) *Attorney, Agent, or Firm* — Perkins Coie LLP

(57) ABSTRACT

A pair of interconnectable handheld controllers is disclosed. The pair of controllers includes a right-hand controller and a left-hand controller. The right-hand controller includes a right-hand handle portion, a surrounding right-hand ring portion, and a first connector disposed on the right-hand ring portion. The left-hand controller includes a left-hand handle portion, a surrounding left-hand ring portion, and a second connector disposed on the left-hand ring portion. The first connector and the second connector are cooperative to releasably attach the right-hand controller and the left-hand controller together. The first connector and the second connector can be magnets, cooperative hook and loop material, or a ball and socket arrangement.

16 Claims, 5 Drawing Sheets

(56) References Cited

U.S. PATENT DOCUMENTS

| | | | | |
|---|---|---|---|---|
| 5,616,078 A | * | 4/1997 | Oh | A63F 13/06 345/156 |
| 5,645,277 A | * | 7/1997 | Cheng | A63F 13/06 273/148 B |
| 5,796,354 A | | 8/1998 | Cartabiano et al. | |
| 5,982,355 A | | 11/1999 | Jaeger et al. | |
| D418,174 S | | 12/1999 | Jankowski | |
| D418,879 S | | 1/2000 | Hornsby et al. | |
| 6,173,203 B1 | | 1/2001 | Barkley et al. | |
| 6,192,253 B1 | | 2/2001 | Charlier et al. | |
| 6,430,110 B2 | | 8/2002 | Baroche et al. | |
| D472,972 S | | 4/2003 | Anderson et al. | |
| 6,572,108 B1 | * | 6/2003 | Bristow | A63F 13/06 273/148 B |
| 6,590,835 B2 | | 7/2003 | Farine et al. | |
| 6,652,383 B1 | * | 11/2003 | Sonoda | A63F 13/12 463/40 |
| 6,970,157 B2 | | 11/2005 | Siddeeq et al. | |
| 7,004,469 B2 | | 2/2006 | von Goeben et al. | |
| 7,106,197 B2 | | 9/2006 | Gaiotto et al. | |
| 7,331,793 B2 | * | 2/2008 | Hernandez | H01F 38/14 439/38 |
| 7,345,670 B2 | | 3/2008 | Armstrong et al. | |
| D586,823 S | | 2/2009 | Anderson et al. | |
| D616,417 S | | 5/2010 | Liao et al. | |
| 8,064,972 B2 | | 11/2011 | Russo et al. | |
| 8,188,842 B2 | | 5/2012 | Otsuka et al. | |
| 8,267,786 B2 | * | 9/2012 | Ikeda | A63F 13/06 463/36 |
| 8,439,753 B2 | * | 5/2013 | Wakitani | A63F 13/06 273/148 B |
| 8,795,078 B1 | | 8/2014 | Musick, Jr. et al. | |
| 8,882,596 B2 | * | 11/2014 | Shimamura | A63F 13/428 463/37 |
| 8,994,643 B2 | | 3/2015 | Goodwin et al. | |
| D729,803 S | | 5/2015 | Avery et al. | |
| 9,141,087 B2 | | 9/2015 | Brown et al. | |
| 9,386,662 B1 | | 7/2016 | Krueger et al. | |
| 9,421,472 B2 | | 8/2016 | Buller et al. | |
| D772,986 S | * | 11/2016 | Chen | A63F 13/00 D14/203.3 |
| D780,807 S | | 3/2017 | Bristol et al. | |
| 9,678,566 B2 | * | 6/2017 | Webb | G06F 3/011 |
| 2001/0015718 A1 | | 8/2001 | Hinckley et al. | |
| 2001/0045938 A1 | * | 11/2001 | Willner | A63F 13/06 345/156 |
| 2003/0100367 A1 | * | 5/2003 | Cooke | A63F 13/02 463/36 |
| 2004/0222963 A1 | | 11/2004 | Guo et al. | |
| 2004/0222970 A1 | * | 11/2004 | Martinez | A63F 13/06 345/169 |
| 2005/0255915 A1 | * | 11/2005 | Riggs | A63F 13/06 463/37 |
| 2006/0287089 A1 | * | 12/2006 | Addington | A63F 13/06 463/37 |
| 2007/0049374 A1 | * | 3/2007 | Ikeda | A63F 13/06 463/30 |
| 2007/0066394 A1 | * | 3/2007 | Ikeda | A63F 13/06 463/37 |
| 2007/0293318 A1 | * | 12/2007 | Tetterington | A63F 13/06 463/37 |
| 2008/0261693 A1 | * | 10/2008 | Zalewski | G06F 3/0304 463/31 |
| 2008/0261695 A1 | * | 10/2008 | Coe | A63F 13/24 463/37 |
| 2009/0005164 A1 | * | 1/2009 | Chang | A63F 13/06 463/37 |
| 2009/0143110 A1 | | 6/2009 | Armstrong et al. | |
| 2009/0149256 A1 | * | 6/2009 | Lui | A63F 13/02 463/37 |
| 2009/0290345 A1 | | 11/2009 | Shaner et al. | |
| 2009/0295721 A1 | | 12/2009 | Yamamoto et al. | |
| 2009/0298590 A1 | * | 12/2009 | Marks | A63F 13/02 463/37 |
| 2010/0009760 A1 | | 1/2010 | Shimamura et al. | |
| 2010/0085321 A1 | | 4/2010 | Pundsack et al. | |
| 2010/0118195 A1 | * | 5/2010 | Eom | G08C 17/00 348/564 |
| 2010/0144436 A1 | | 6/2010 | Marks et al. | |
| 2011/0294579 A1 | * | 12/2011 | Marks | G06F 3/0304 463/36 |
| 2012/0088582 A1 | * | 4/2012 | Wu | A63F 13/211 463/37 |
| 2012/0202597 A1 | * | 8/2012 | Yee | A63F 13/843 463/37 |
| 2013/0324254 A1 | | 12/2013 | Huang et al. | |
| 2014/0015813 A1 | * | 1/2014 | Numaguchi | G06F 3/01 345/184 |
| 2014/0141891 A1 | * | 5/2014 | Georgy | A63F 13/02 463/47 |
| 2014/0228124 A1 | * | 8/2014 | Plagge | G08C 23/04 463/39 |
| 2014/0273546 A1 | * | 9/2014 | Harmon | H01R 13/6205 439/39 |
| 2014/0361977 A1 | | 12/2014 | Mao et al. | |
| 2014/0362110 A1 | * | 12/2014 | Stafford | G06F 3/013 345/633 |
| 2014/0364212 A1 | * | 12/2014 | Osman | A63F 13/213 463/31 |
| 2015/0077398 A1 | | 3/2015 | Yairi et al. | |
| 2015/0094142 A1 | * | 4/2015 | Stafford | A63F 13/212 463/31 |
| 2015/0155445 A1 | | 6/2015 | Crowder et al. | |
| 2015/0234477 A1 | * | 8/2015 | Abovitz | G06K 9/00671 382/103 |
| 2015/0258431 A1 | * | 9/2015 | Stafford | A63F 13/213 463/31 |
| 2015/0258432 A1 | * | 9/2015 | Stafford | A63F 13/213 463/32 |
| 2015/0268920 A1 | | 9/2015 | Schapiro | |
| 2015/0370320 A1 | | 12/2015 | Connor et al. | |
| 2016/0357249 A1 | * | 12/2016 | Webb | G06F 3/011 |
| 2016/0357261 A1 | * | 12/2016 | Bristol | A63F 13/24 |
| 2016/0361637 A1 | * | 12/2016 | Higgins | A63F 13/24 |
| 2016/0361638 A1 | * | 12/2016 | Higgins | A63F 13/24 |
| 2016/0363996 A1 | * | 12/2016 | Higgins | G06F 3/014 |
| 2016/0364910 A1 | | 12/2016 | Katz et al. | |
| 2017/0131767 A1 | | 5/2017 | Long | |
| 2017/0136351 A1 | | 5/2017 | Long | |
| 2017/0139481 A1 | | 5/2017 | Long et al. | |
| 2017/0168303 A1 | | 6/2017 | Petrov et al. | |
| 2017/0177102 A1 | | 6/2017 | Long et al. | |
| 2017/0189798 A1 | | 7/2017 | Rogoza et al. | |
| 2017/0189799 A1 | | 7/2017 | Anderson et al. | |
| 2017/0189802 A1 | | 7/2017 | Rogoza et al. | |
| 2017/0192495 A1 | | 7/2017 | Drinkwater et al. | |
| 2017/0192506 A1 | | 7/2017 | Andersen et al. | |

OTHER PUBLICATIONS

"STEM System" accessed and printed from URL <http://sixense.com/wireless>, 5 pages.*
Canadian Examiner's Report in Patent Application No. 163,150, dated Dec. 15, 2015, 5 pages.
Canadian Examiner's Report in Patent Application No. 163,150, dated Apr. 8, 2016, 7 pages.
Canadian Examiner's Report in Patent Application No. 167,457, dated Apr. 8, 2016, 1 page.
Canadian Examiner's Report in Patent Application No. 167,458, dated Apr. 8, 2016, 1 page.
Canadian Examiner's Report in Patent Application No. 167,456, dated Apr. 8, 2016, 1 page.
First Examination Report in Indian Patent Application No. 278272, dated Mar. 18, 2016, 2 pages.
First Examination Report in Indian Patent Application No. 278275, dated Mar. 28, 2016, 2 pages.
First Examination Report in Indian Patent Application No. 278274, dated Mar. 14, 2016, 2 pages.

(56) References Cited

OTHER PUBLICATIONS

First Examination Report in Indian Patent Application No. 278273, dated Mar. 18, 2016, 2 pages.
Office Action in Korean Patent Application No. 30-2015-0063452, dated Aug. 9, 2016, 3 pages.
Office Action in Mexican Design Patent Application No. MX/f/2015/003769, dated Feb. 7, 2017, 4 pages.
U.S. Appl. No. 29/529,915 by Chen, Y., et al., filed Jun. 11, 2015.
U.S. Appl. No. 29/571,025 by Chen, Y., et al., filed Jul. 13, 2016.
U.S. Appl. No. 29/571,027 by Chen, Y., et al., filed Jul. 13, 2016.
U.S. Appl. No. 29/571,030 by Chen, Y., et al., filed Jul. 13, 2016.
U.S. Appl. No. 14/991,875 by Drinkwater, J., et al., filed Jan. 8, 2016.
U.S. Appl. No. 15/172,099 by Rogoza, B., et al., filed Jun. 2, 2016.
U.S. Appl. No. 15/173,474 by Rogoza, B., et al., filed Jun. 3, 2016.
U.S. Appl. No. 15/173,558 by Andersen, B., et al., filed Jun. 3, 2016.
U.S. Appl. No. 15/177,121 by Anderson, B., et al., filed Jun. 2, 2016.
U.S. Appl. No. 29/579,091 by Chen, Y., et al., filed Sep. 27, 2016.
Notice of Allowance dated Jun. 29, 2016, for U.S. Appl. No. 29/529,915 by Chen, Y., et al., filed Jun. 11, 2015.
Restriction Requirement dated Apr. 8, 2016, for U.S. Appl. No. 29/529,915 by Chen, Y., et al., filed Jun. 11, 2015.
Notice of Allowance dated Sep. 27, 2016, for U.S. Appl. No. 29/529,915 by Chen, Y., et al., filed Jun. 11, 2015.
Non-Final Office Action dated Mar. 23, 2017 for U.S. Appl. No. 14/934,073 by Long, C., et al., filed Nov. 5, 2015.
Non-Final Office Action dated Mar. 30, 2017 for U.S. Appl. No. 14/939,470 by Long, C., et al., filed Nov. 12, 2015.
Non-Final Office Action dated Apr. 7, 2017 for U.S. Appl. No. 14/975,049 by Long, C., et al., filed Dec. 18, 2015.
Ex Parte Quayle Action dated May 5, 2017 for U.S. Appl. No. 29/571,027 by Chen, Y., et al., filed Jul. 13, 2016.
Ex Parte Quayle Action dated May 5, 2017 for U.S. Appl. No. 29/571,030 by Chen, Y., et al., filed Jul. 13, 2016.
Ex Parte Quayle Action dated May 8, 2017 for U.S. Appl. No. 29/571,025 by Chen, Y., et al., filed Jul. 13, 2016.
Notice of Allowance dated Jun. 15, 2017 of U.S. Appl. No. 29/571,030 by Chen, Y., et al., filed Jul. 13, 2016.
Notice of Allowance dated Jun. 21, 2017 for U.S. Appl. No. 29/571,025 by Chen, Y., et al., filed Jul. 13, 2016.
Notice of Allowance dated Jun. 22, 2017 for U.S. Appl. No. 29/571,027 by Chen, Y., et al., filed Jul. 13, 2016.
Office Action in Brazil Design Patent Application No. 30-2015-005620-7, dated May 30, 2017, 30 pages.
Supplemental Notice of Allowability dated Jul. 10, 2017 of U.S. Appl. No. 29/571,030 by Chen, Y., et al., filed Jul. 13, 2016.
Supplemental Notice of Allowability dated Jul. 6, 2017 for U.S. Appl. No. 29/571,025 by Chen, Y., et al., filed Jul. 13, 2016.
Non-Final Office Action dated Jul. 17, 2017 for U.S. Appl. No. 14/939,431 by Long, C., et al., filed Nov. 12, 2015.
Final Office Action dated Aug. 18, 2017 for U.S. Appl. No. 14/939,470 by Long, C., et al., filed Nov. 12, 2015.
Non-Final Office Action dated Aug. 24, 2017 for U.S. Appl. No. 14/991,875 by Drinkwater, J., et al., filed Jan. 8, 2016.
Notice of Allowance dated Sep. 15, 2017 for U.S. Appl. No. 14/975,049 by Long, C. et al., filed Dec. 15, 2015.
U.S. Appl. No. 29/611,924 by Chen, Y., et al., filed Jul. 26, 2017.
U.S. Appl. No. 14/934,073 by Long, C., et al., filed Nov. 5, 2015.
U.S. Appl. No. 14/939,431 by Long, C., et al., filed Nov. 12, 2015.
U.S. Appl. No. 14/939,470 by Long, C., et al., filed Nov. 12, 2015.
U.S. Appl. No. 14/975,049 by Long, C., et al., filed Dec. 18, 2015.

\* cited by examiner

INTERCONNECTABLE HANDHELD CONTROLLERS

TECHNICAL FIELD

This patent application is directed to handheld controllers and, more specifically, to handheld controllers for virtual reality systems.

BACKGROUND

In a virtual reality system, handheld controllers can be used by a user to manipulate virtual items within a virtual setting. The user typically wears a head-mounted display that presents a selected virtual reality (VR) environment in front of the user's eyes, but which can obscure the user's view of the real world. Accordingly, if a user sets down one of the handheld controllers, it may be difficult to find that controller again without moving or removing the head mounted display, which can interrupt use of the VR system. In some virtual reality systems, the handheld controllers are highly contoured or otherwise unstable when set on a surface, such that the controllers may tip over and inadvertently activate certain buttons and/or send an errant command to the VR system. Therefore, there is need for handheld controllers that address these issues.

BRIEF DESCRIPTION OF THE DRAWINGS

Embodiments of the interconnectable handheld controllers introduced herein may be better understood by referring to the following Detailed Description in conjunction with the accompanying drawings, in which like reference numerals indicate identical or functionally similar elements.

Figure 1:
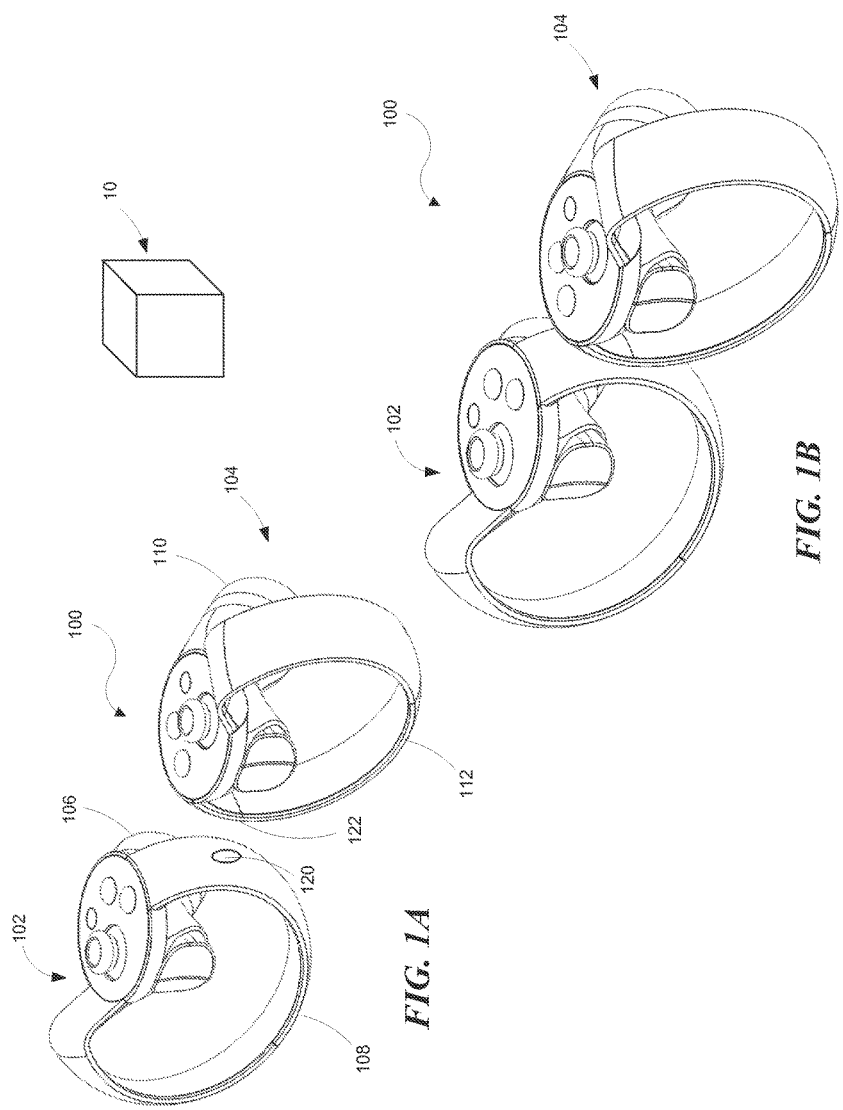
FIG. 1A is a perspective view of a pair of interconnectable handheld controllers according to a representative embodiment.
FIG. 1B is a perspective view of the interconnectable handheld controllers of FIG. 1A connected together.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A pair of interconnectable handheld controllers is disclosed. The pair of controllers includes a right-hand controller and a left-hand controller. The right-hand controller includes a right-hand handle portion, a surrounding right-hand ring portion, and a first connector disposed on the right-hand ring portion. The left-hand controller includes a left-hand handle portion, a surrounding left-hand ring portion, and a second connector disposed on the left-hand ring portion. The first connector and the second connector are cooperative to releasably attach the right-hand controller and the left-hand controller together.

In some embodiments, the first connector and the second connector are magnets. In some embodiments, one of the first and second connectors is loop material, and the other of the first and second connectors is hook material. In some embodiments, one of the first and second connectors is a ball or tee, and the other of the first and second connectors is a socket or receptacle configured to releasably receive the ball or tee. In some embodiments, the right-hand and the left-hand controllers are substantially symmetric with respect to each other.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1A illustrates a pair of interconnectable handheld controllers 100 according to a representative embodiment. The pair of interconnectable handheld controllers 100 includes first and second controllers, such as a right-hand controller 102 and a left-hand controller 104. Each controller includes a handle portion and a tracking frame. The tracking frame supports one or more tracking features 117 (see FIG. 2), such as for example, fiducial markers or light emitting diodes. In at least one embodiment, the right-hand controller 102 includes a contoured right-handed handle portion 106 with a tracking frame in the form of a surrounding ring portion 108. Similarly, the left-hand controller 104 includes a contoured left-handed handle portion 110 and a surrounding ring portion 112. In some embodiments, the controllers 102/104 are substantially symmetrical with respect to each other (e.g., mirror images of each other). Each controller also includes a connector whereby the right-hand controller 102 and the left-hand controller 104 can be releasably connected together. In the depicted embodiment, the right-hand controller 102 includes a connector 120, and the left-hand controller 104 includes a connector 122. In some embodiments, the connectors 120 and 122 can be magnets sized and positioned to allow for the interconnection, but do not create electrical interference with operation of the controllers 100. For example, the connectors 120 and 122 can be rare earth magnets including, for example, neodymium magnets. In other embodiments, the connectors 120 and 122 can be comprised of cooperative hook and loop material, such as Velcro®, or other connection mechanism.

As shown in FIG. 1A, the connectors 120 and 122 are positioned on the surrounding ring portions 108 and 112 such that they face each other when the controllers 102/104 are adjacent to each other with a similar spatial orientation. In other embodiments, the connectors 120 and 122 can be positioned on different quadrants (e.g., outside, bottom, or top) of the surrounding ring portions 108 and 112. FIG. 1B illustrates the right-hand controller 102 and the left-hand controller 104 connected together. When the controllers 102/104 are connected together and placed, for example, on a table or other support surface, they support each other and block each other from rolling on the support surface about the surrounding ring portions. Thus, when connected together, the controllers 102/104 have at least three points of contact on the support surface providing a stable structure to prevent tipping and/or rolling of the individual controllers 102/104. As depicted in FIG. 1B, the controllers 102/104 have four points of contact provided by the surrounding ring portions 108 and 112 and the handle portions 106/110. In addition, when a user is interacting with a VR system 10, such as the Rift™ available from Oculus™, using the left and right controllers 102/104, the user can interconnect the controllers 102/104 by attaching the connectors 120/122 together and then let go of one of the controllers 102/104, which can free one of the user's hands in order to pick something up or to adjust his or her head-mounted display without having to set down the released controller on a support surface. For example, a user may connect the right-hand controller 102 and the left-hand controller 104 together and then release his or her hand from the left-hand controller 104 in order to adjust the head-mounted display without setting down the left-hand controller 104 and potentially losing the controller or otherwise interrupting the interaction with the VR system 10.

Figure 2:
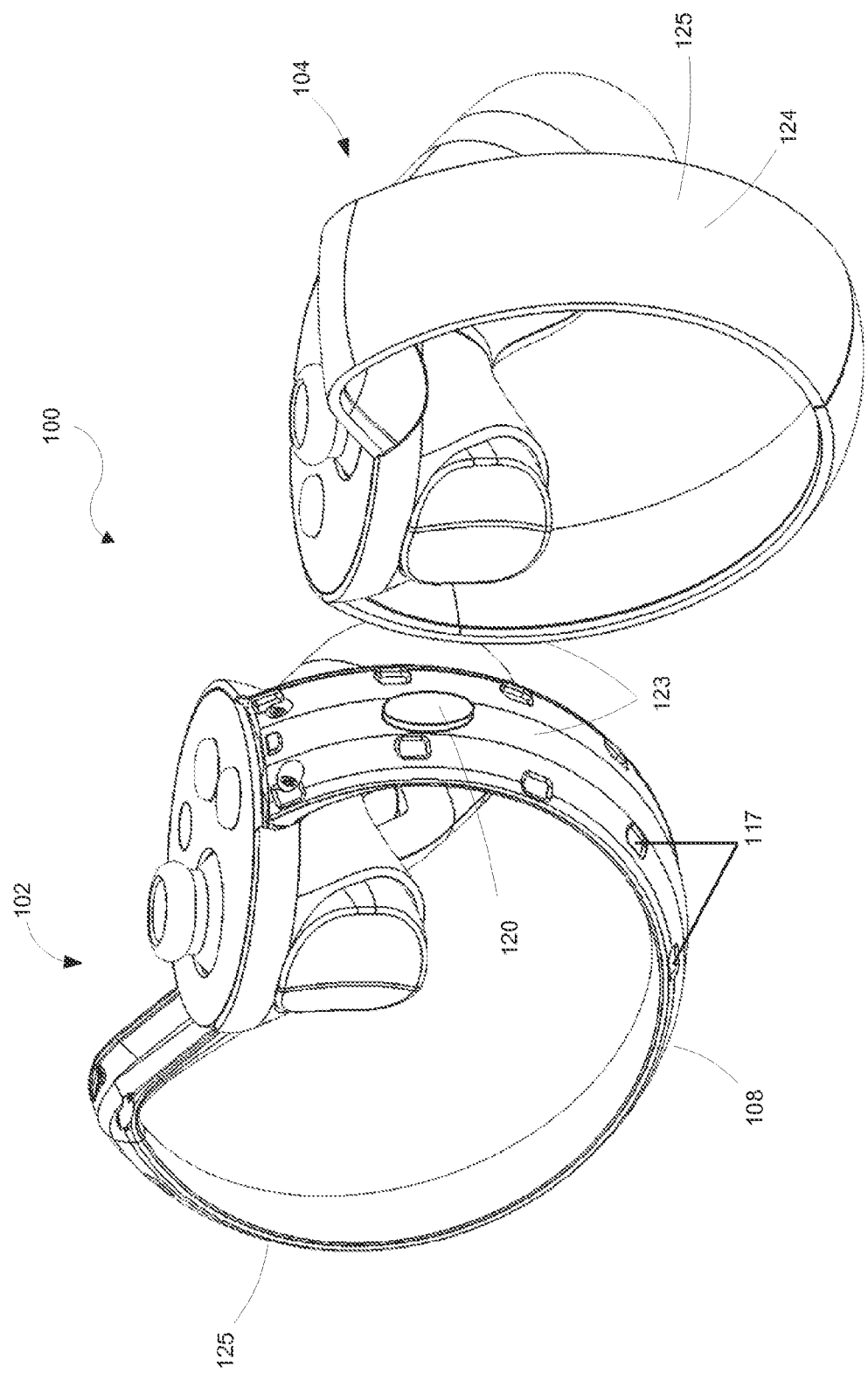
FIG. 2 is a perspective view of the interconnectable handheld controllers shown in FIGS. 1A and 1B with a portion of one of the controllers removed to illustrate the construction thereof.

FIG. 2 illustrates the left and right-hand controllers 102/104 of an embodiment, and outer cover 124 of the right-hand controller 102 is not shown for purposes of clarity and to illustrate the mounting location of magnet 120 in the ring portion 108. For purposes of discussion, and from the perspective of the left and right-hand controllers 102/104 positioned in a connecting position adjacent to each other with a similar spatial orientation, the ring portion 108 of each controller 102/104 has a medial side 123 immediately adjacent to and facing toward the other controller. The ring portions 108 each have a lateral side 125 opposite the medial side 123 and spaced furthest away from the other controller. In the illustrated embodiment, the magnets 120 are mounted to the medial side 123 of the surrounding ring portion 108 of each controller 102/104. Thus, the magnet 120 can be mounted flush with the surface of the surrounding ring portion 108 and partially exposed as shown in, for example, FIG. 1A. In other embodiments, the magnet 120 can be disposed underneath the surface of the outer cover 124.

Figure 3:
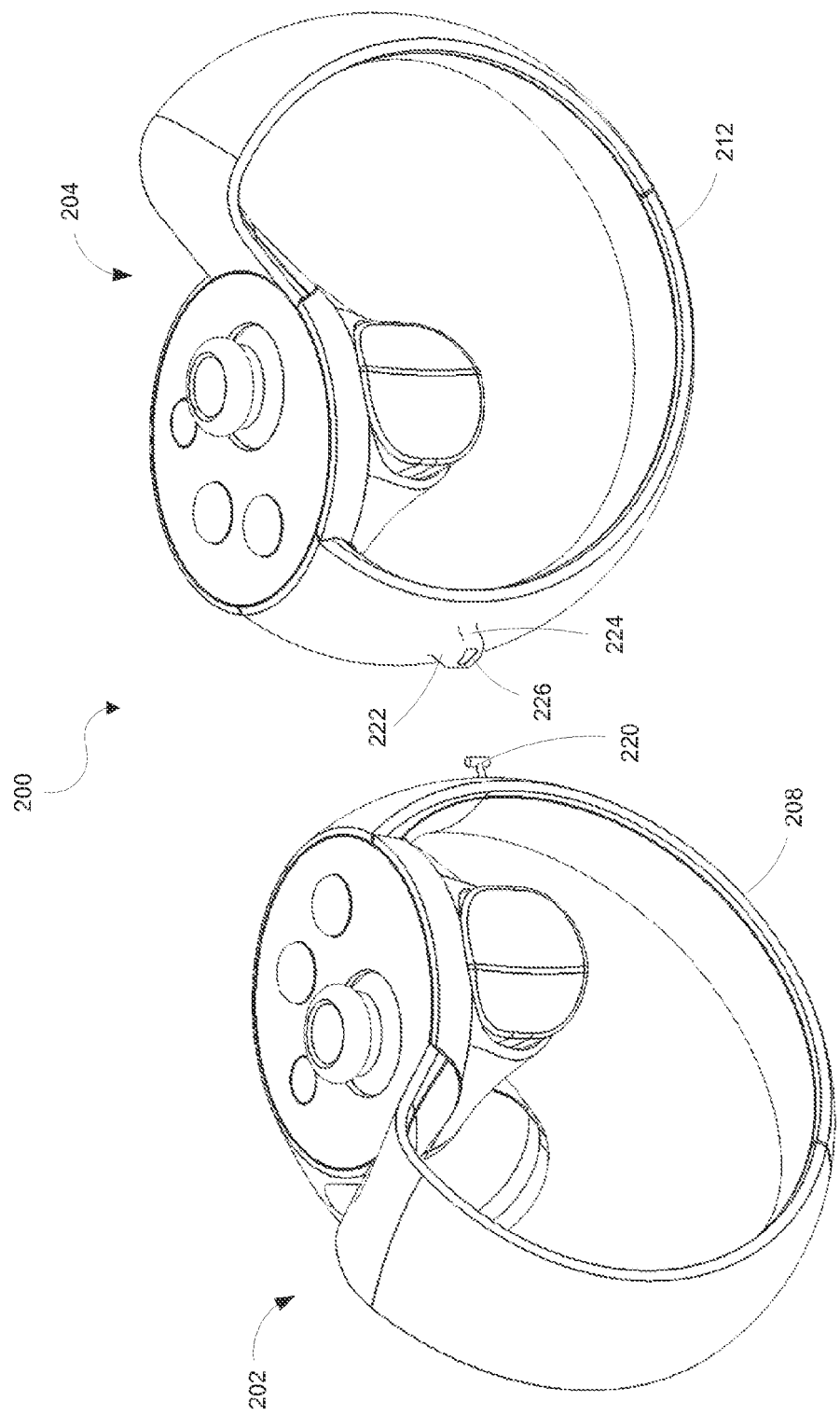
FIG. 3 is a perspective view of a pair of interconnectable handheld controllers according to another representative embodiment.

FIG. 3 illustrates another representative embodiment of an interconnectable pair of handheld controllers 200. The interconnectable pair of handheld controllers 200 includes a right-hand controller 202 and a left-hand controller 204. The controllers 202 and 204 include a surrounding ring portion 208 and 212, respectively. As with the embodiment discussed above with respect to FIGS. 1A-2, the controllers 202 and 204 include cooperative connectors. In this embodiment, the connectors are in the form of a tee or tee shaped member 220 which mates with a slotted socket 222. The slotted socket 222 includes a boss 224 disposed on the surrounding ring portion 212 of one of the controllers, such as the left-hand controller 204 as illustrated. The boss 224 includes a slotted receptacle 226 configured to receive the tee 220. Accordingly, a user can rotate the right-hand controller 202 with respect to the left-hand controller 204 (or vice versa) to insert the tee 220 into the slotted receptacle 226. When the controllers 202/204 are rotated back into substantially the same spatial orientation relative to each other, the tee 220 is captured within the slotted receptacle 226, thereby connecting the controllers 202/204 together.

Figure 4:
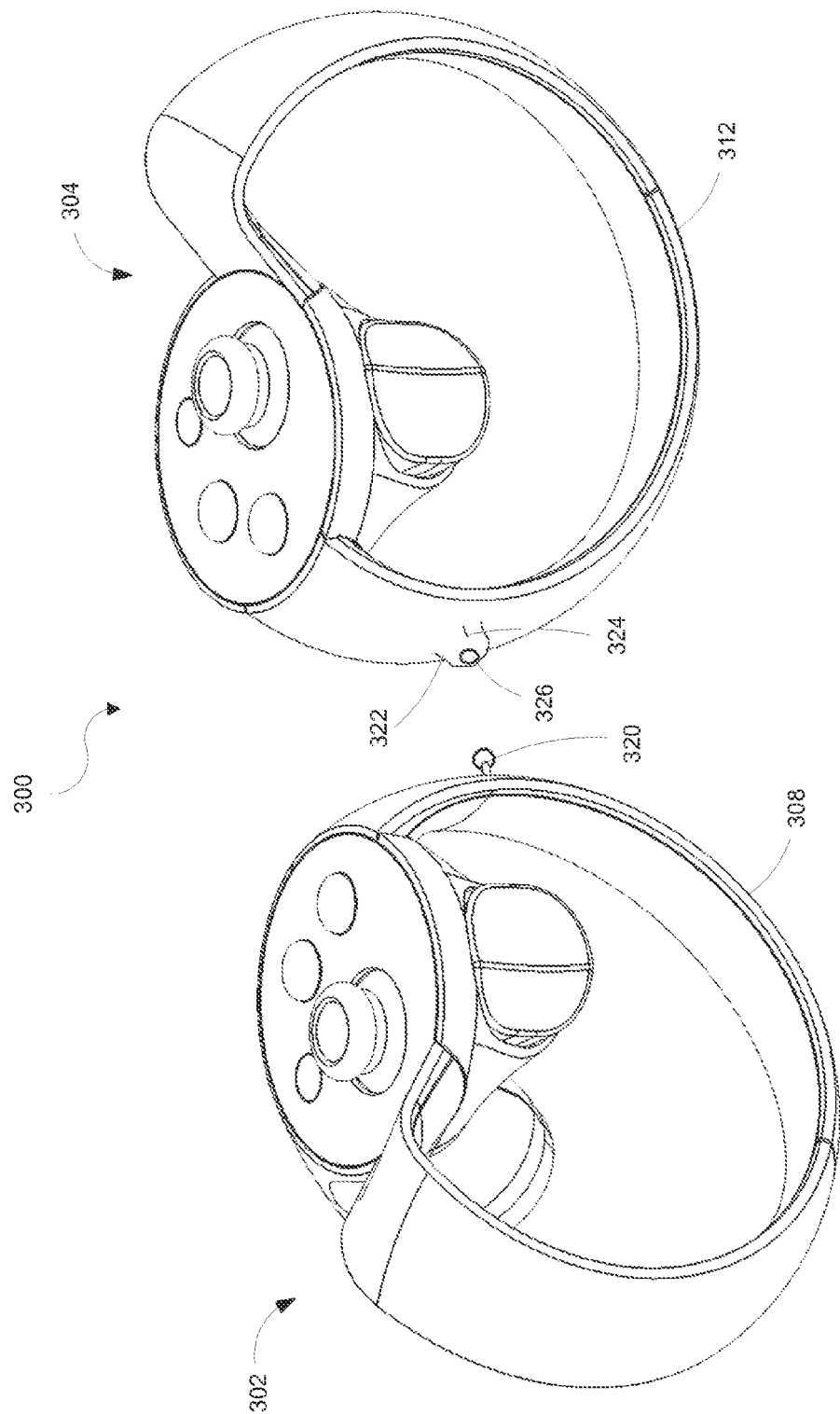
FIG. 4 is a perspective view of a pair of interconnectable handheld controllers according to yet another representative embodiment.

FIG. 4 illustrates an interconnectable pair of handheld controllers 300 according to another representative embodiment. The interconnectable pair of handheld controllers 300 includes a right-hand controller 302 and a left-hand controller 304. As above, each controller includes a surrounding ring portion 308 and 312, respectively. A ball 320 is disposed on surrounding ring portion 308 of one of the controllers, such as the right-hand controller 302 as illustrated. A corresponding socket 322 is disposed on the surrounding ring portion 312 of the other controller, such as the left-hand controller 304. The socket 322 is comprised of a boss 324 including a socket aperture 326 sized and configured to receive and releasably retain the ball 320. The socket aperture 326 is configured such that ball 320 snaps into the socket 322, thereby interconnecting the left-hand and right-hand controllers 302/304.

Figure 5:
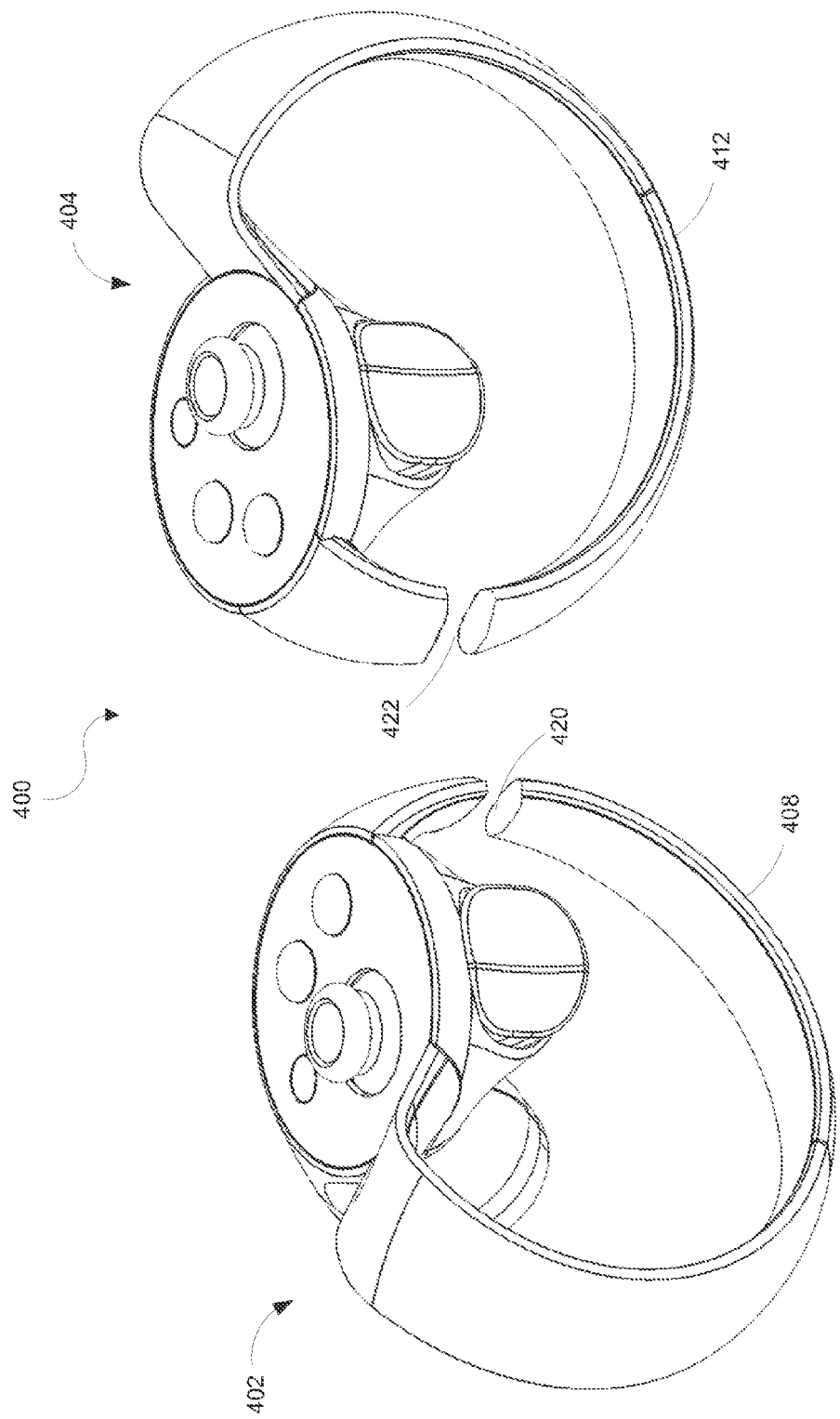
FIG. 5 is a perspective view of a pair of interconnectable handheld controllers according to a further representative embodiment.

FIG. 5 illustrates a pair of interconnectable handheld controllers 400 according to a further representative embodiment. The pair of interconnectable handheld controllers 400 includes a right-hand controller 402 and a left-hand controller 404, each of which includes a surrounding ring portion 408 and 412, respectively. One or both of the surrounding ring portions 408 and 412 includes a gap 422 formed through the surrounding ring portion. For example, the surrounding ring portion 408 of the right-hand controller 402 includes a gap 420, and the surrounding ring portion 412 of the left-hand controller 402 includes a gap 422. The gaps 420 and 422 are sized such that the surrounding ring of the opposing controller can be inserted through the gap, thereby connecting the surrounding rings together. For example, the surrounding ring portion 412 can be inserted through the gap 420 such that the surrounding ring portions 408 and 412 are connected together, thereby easily and quickly releasably interconnecting the controllers 402 and 404.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A pair of handheld controllers, comprising:
    a right-hand controller, including:
        a right-hand handle portion;
        a right-hand ring-shaped tracking frame extending from opposite sides of and surrounding the right-hand handle portion;
        a plurality of right-hand light sources disposed on the right-hand tracking frame; and
        a first connector disposed on the right-hand tracking frame; and
    a left-hand controller, including:
        a left-hand handle portion;
        a left-hand ring-shaped tracking frame extending from opposite sides of and surrounding the left-hand handle portion;
        a plurality of left-hand light sources disposed on the left-hand tracking frame; and
        a second connector disposed on the left-hand tracking frame;
    wherein the first connector and the second connector are cooperative to releasably attach the right-hand controller and the left-hand controller together.

2. The pair of handheld controllers of claim 1, wherein the first connector and the second connector are magnets.

3. The pair of handheld controllers of claim 1, wherein one of the first connector and the second connector is loop material, and the other of the first connector and the second connector is hook material.

4. The pair of handheld controllers of claim 1, wherein one of the first connector and the second connector is a ball, and the other of the first connector and the second connector is a socket configured to releasably receive the ball therein.

5. The pair of handheld controllers of claim 1, wherein one of the first connector and the second connector is a tee shaped member, and the other of the first connector and the second connector is a slotted receptacle configured to releasably receive the tee shaped member therein.

6. A pair of handheld controllers, comprising:
    a right-hand controller, including:
        a right-hand handle portion;
        a surrounding right-hand ring portion extending from opposite sides of and surrounding the right-hand handle portion;
        a plurality of right-hand light sources disposed on the surrounding right-hand ring portion; and
        a first connector disposed on the surrounding right-hand ring portion; and
    a left-hand controller, including:
        a left-hand handle portion;
        a surrounding left-hand ring portion extending from opposite sides of and surrounding the left-hand handle portion;
        a plurality of left-hand light sources disposed on the surrounding left-hand ring portion; and
        a second connector disposed on the surrounding left-hand ring portion;
    wherein the first connector and the second connector are cooperative to releasably attach the right-hand controller and the left-hand controller together.

7. The pair of handheld controllers of claim 6, wherein the right-hand controller and the left-hand controller are substantially symmetric with respect to each other.

8. The pair of handheld controllers of claim 6, wherein the first connector and the second connector are magnets.

9. The pair of handheld controllers of claim 8, wherein at least one of the magnets is positioned substantially flush with an outer surface of one of the surrounding right-hand ring portion or the surrounding left-hand ring portion.

10. The pair of handheld controllers of claim 8, wherein the magnets include a first magnet positioned underneath a first outer surface of each of the surrounding right-hand ring portion and a second magnet positioned underneath a second outer surface of the surrounding left-hand ring portion.

11. The pair of handheld controllers of claim 6, wherein one of the first connector and the second connector is loop material, and the other of the first connector and the second connector is hook material.

12. The pair of handheld controllers of claim 6, wherein one of the first connector and the second connector is a ball, and the other of the first connector and the second connector is a socket configured to releasably receive the ball therein.

13. The pair of handheld controllers of claim 6, wherein one of the first connector and the second connector is a tee shaped member, and the other of the first connector and the second connector is a slotted receptacle configured to releasably receive the tee therein.

14. A pair of handheld controllers, comprising:
    a first controller, including:
        a first handle portion;
        a first ring-shaped frame portion extending from opposite sides of and surrounding the first handle portion; and
        a plurality of first light sources disposed on the first ring-shaped frame portion; and
    a second controller, including:
        a second handle portion;
        a second ring-shaped frame portion extending from opposite sides of and surrounding the second handle portion; and
        a plurality of second light sources disposed on the second ring-shaped frame portion;
    wherein the second ring-shaped frame portion includes a gap formed in the second ring-shaped frame portion, whereby the first ring-shaped frame portion and the second ring-shaped frame portion can be linked together.

15. The pair of handheld controllers of claim 14, wherein the first ring-shaped frame portion includes a gap formed in the first ring-shaped frame portion, whereby the first ring-shaped frame portion and the second ring-shaped frame portion can be linked together.

16. The pair of handheld controllers of claim 14, wherein the first controller and the second controller are substantially symmetric with respect to each other.

* * * * *